Patented July 10, 1928.

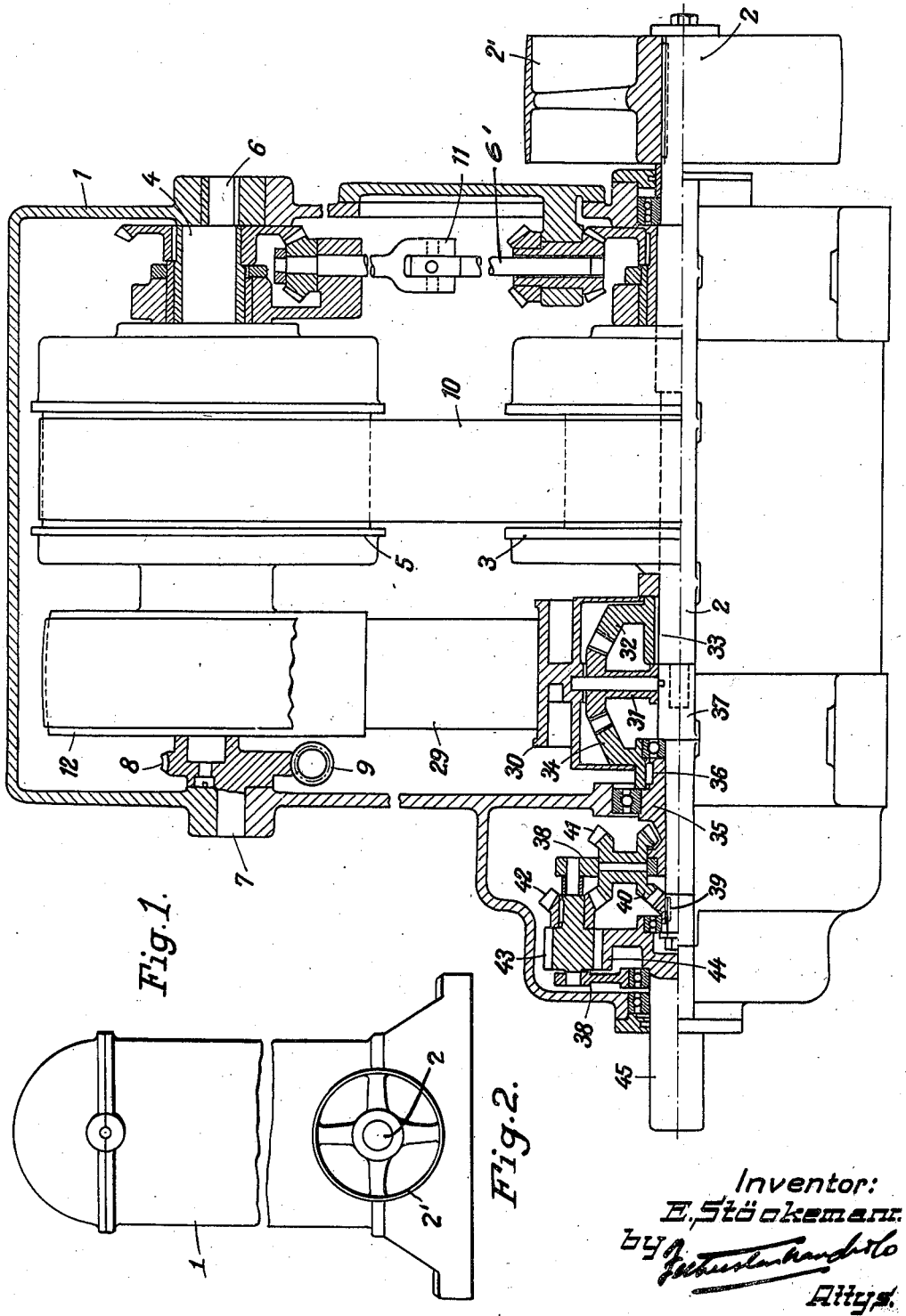

1,676,367

UNITED STATES PATENT OFFICE.

ERNST STÖCKEMANN, OF BERLIN-TEMPELHOF, GERMANY.

STAGELESS CHANGE-SPEED GEARING.

Application filed February 1, 1927, Serial No. 165,169, and in Germany February 7, 1926.

All stageless change-speed-gears hitherto known, by which control is effected by friction-gears or belt-pulley-drives, have the great disadvantage, that the driven shaft is always moved by the power limited by the adhesion of the driving-elements and that the output, resulting from the product of load and length of way, is reduced on the driven shaft under reduction of the number of revolutions.

In the change-speed-gearing according to the present invention, this drawback is entirely eliminated. The output remains perfectly equal with the same between any selected minimum number of revolutions and any selected maximum number of revolutions. This is achieved in such a manner, that between a change-speed-gearing of any one known construction, practically adapted to be regulated down to about naught and the driven shaft, a planet-gear-movement is provided, and that a second planet-gear-movement is arranged the wheels of which are partly driven by the first planet-gear-movement and partly by the driving shaft. Under corresponding adjustment of the change-speed-gearing it is possible to prevent rotation of the planet-gear-carrier, so that the planet-gears, act as ordinary transmission-gears and a great turning moment is produced.

The object of the invention is illustrated by an example in the accompanying drawing, in which Fig. 1 is a vertical, longitudinal section, Fig. 2 an end-view in reduced scale.

The gearing consists of a casing 1, in which the driving shaft 2 is disposed. Outside of the casing, the shaft 2 carries a belt-pulley 2', inside of the casing 1, a belt-pulley 3 is mounted upon the shaft 2, the diameter of which is variable in known manner. This belt-pulley is advantageously made in accordance with the American Patent-specification 1,581,697.

A second shaft 4 is provided in the casing 1, upon which a belt-pulley 5 is mounted, the diameter of which is likewise variable.

Both belt-pulleys are simultaneously adjusted thus, that the diameter of the one pulley is reduced, while the diameter of the other one is increased.

The adjustment-devices of the two pulleys 3 and 5 are coupled by means of the shaft 6'.

The shaft 4 is supported in the casing 1 by means of eccentric pivots 6 and 7. It can be adjusted by means of the worm-wheel 8 and the worm 9, in order to regulate the tension of the belt 10. To enable adjustment of the shaft 4, the rod 6' is provided with Cardan-joint 11.

Another belt-pulley 12 is rigidly connected with the belt-pulley 5.

A driving-belt 29 runs from the belt-pulley 12 to a belt-pulley 30, designed as carrier for the planet-wheels 31. These planet-wheels 31 mesh on the one hand with a mangle-wheel 32, firmly connected upon the driving shaft 2 by means of a key 33 and on the other hand in a central wheel 34 fixed upon a hollow shaft 35, by means of a key 36. The belt-pulley 30 is mounted upon a shaft 37, this shaft 37 is disposed in the direction of the axis of the driving shaft 2, but the shaft 37 is rotatable against the shaft 2. The hollow shaft 35 is slipped over this shaft 37. The hollow shaft 35 is rigidly connected with a drum 38. A planet-gear-movement is arranged in this drum. The mangle-wheel 39 of this gearing is arranged upon the shaft 37, it is designed as bevel-gear and acts upon a bevel-gear 40 likewise supported inside the drum 38. The axle of the bevel-gear 40 is disposed radially. The bevel-gear 40 is firmly connected with a bevel-gear 41 of like diameter as the bevel-gear 40. The bevel-gear 41 drives a bevel-gear 42 firmly connected with a spur-gear 43. The mean pitch-circle-diameter of the bevel-gear 42 is equal to the pitch-circle-diameter of the gear 43. The toothed wheel 43 meshes with a gear 44, rigidly connected with the driven shaft 45.

The mode of action of this gearing is as follows:

As soon, as the shaft 2 is moved by the belt-pulley 2', the shaft 2 is driving the mangle-wheel 32; the belt-pulley 30 with its planet wheels 31 is simultaneously driven by the belt-pulleys 3, 5 and 12 in the same direction as the mangle wheel 32. By adjustment of the diameters of the belt-pulleys 3 and 5, the belt-pulley 30 with its planet wheels 31 may be made to rotate at any desired number of revolutions. If the number of revolutions of the belt-pulley 30 is equal to the number of revolutions of the driving shaft 2, the driven shaft 45 is driven direct. All toothed wheels serve in this case simply as coupling, but do not revolve over one another.

If the number of revolutions of the belt-pulley 30 is getting greater than the number of revolutions of the driving shaft 2, the direct drive is partly cut out and indirect driving is effected. The wheel 34 and the hollow shaft 35 have now a greater number of revolutions than the shaft 37 so that the mangle wheel 39, the bevel gear 40 and the bevel gears 41 and 42 drive the spur gear 43 and the gear 44 in a direction which diminishes the number of revolutions of the driven shaft 45.

By further increasing the number of revolutions of the belt-pulley 30, the spur gear 43 can be rotated with such a velocity that the number of revolutions of the driven shaft 45 is equal to naught.

Under all numbers of revolutions ranging above the minimum number of revolutions by indirect driving up to the maximum number of revolutions by direct driving, the power of the driven shaft will always reman the same, as the forces of indirect driving, as well as the forces of direct driving act in the same direction upon the shaft 45. The reaction of the tooth-pressure of the planet-wheels 43, which must to be taken up by the belt, is greatly diminished in consequence of the arrangement of the double bevel-gear 40, 41, or compensated.

I claim:

1. In a stageless change-speed-gearing a driving-shaft, a counter shaft parallel to said driving shaft, a stageless belt-pulley change-speed-gear between said shafts, an intermediate shaft coaxial to said driving shaft, a hollow shaft surrounding said intermediate shaft, a planet gear movement, the intermeshing wheels of said planet gear movement being arranged upon said driving shaft, upon said intermediate shaft and upon said hollow shaft, a belt drive between said countershaft and said intermediate shaft, through the agency of which the wheels upon the intermediate shaft are caused to travel around the axis of said shaft at a rate of speed corresponding to or varying from that at which the drive shaft is rotated, a driven shaft, a second planet-gear movement, the wheels of said second planet gear movement being arranged upon said intermediate shaft, upon said hollow shaft and upon said driven shaft.

2. In a stageless change-speed-gearing a driving shaft, a counter shaft parallel to said driving shaft, an intermediate shaft coaxial to said driving shaft, a hollow shaft surrounding said intermediate shaft, a belt-pulley of variable diameter on said driving shaft, a corresponding belt-pulley and a third belt-pulley of invariable diameter fixed upon said counter shaft, a fourth belt-pulley disposed upon said intermediate shaft, a belt connecting the first and second mentioned pulleys, a second belt connecting the third and fourth pulleys, a planet gear movement, the planet wheels being carried by the belt-pulley upon said intermediate shaft, the first mangle-wheel of said gear being disposed upon said driving shaft in mesh with said planet wheels, and the second mangle wheel being disposed upon said hollow shaft in mesh with said plant wheels, a driven shaft, a second planet-gear movement, the intermeshing wheels of said second planet gear movement being arranged upon said intermediate shaft, upon said hollow shaft and upon said driven shaft.

3. In a stageless change-speed-gearing a driving shaft, a counter shaft parallel to said driving shaft, an intermediate shaft coaxial to said driving shaft, a hollow shaft surrounding said intermediate shaft, a belt-pulley of variable diameter on said driving shaft, a corresponding belt-pulley and a third belt-pulley of invariable diameter fixed upon said counter shaft, a fourth belt-pulley disposed upon said intermediate shaft, a belt pulley connecting the first and second mentioned pulleys, a second belt connecting the third and fourth pulleys, a planet gear movement, the planet wheels being carried by the belt-pulley upon said intermediate shaft and adapted to be revolved around the axis of said shaft at a rate of speed corresponding to or varying from the speed of the driving shaft, dependent upon adjustment of the diameters of the first and second mentioned pulleys, the first mangle-wheel of said gear being disposed upon said driving shaft in mesh with said planet wheels and the second mangle wheel, in mesh with said planet wheels being disposed upon the hollow shaft surrounding said intermediate shaft, a driven shaft and a second planet gear movement including a mangle wheel disposed upon said intermediate shaft, a planet wheel meshing with said mangle wheel and mounted in a carrier connected to the hollow shaft surrounding said intermediate shaft and a second mangle wheel driven by the planet wheel and disposed upon the driven shaft.

4. In a stageless change-speed-gearing a driving shaft, a counter shaft parallel to said driving shaft, an intermediate shaft coaxial to said driving shaft, a hollow shaft surrounding said intermediate shaft, a belt-pulley of variable diameter on said driving shaft, a second belt pulley of variable diameter fixed upon said counter shaft, a belt connecting said pulleys, a third belt-pulley of invariable diameter fixed upon said counter shaft, a fourth belt-pulley disposed upon said intermediate shaft, a second belt connecting the third and fourth belt-pulleys, a planet gear movement, the planet wheels being carried by the belt-pulley upon said intermediate shaft and revolvable about the axis of said shaft at various speeds dependent upon adjustment of the variable diameter pulleys carried by the driving and counter shafts, the first mangle-wheel of said gear being disposed upon said driving shaft and the second mangle wheel being disposed upon the hollow shaft surrounding said intermediate shaft, a driven shaft a second planet gear movement, the first mangle wheel of said second gear being disposed upon said intermediate shaft and being designed as a bevel-gear, a second bevel-gear meshing into said mangle wheel, the axis of said second bevel-gear being directed radially, a third bevel-gear firmly connected to said second bevel-gear, a fourth bevel gear meshing with said third bevel-gear, a planet wheel rigidly connected to said fourth bevel gear, said second, third and fourth bevel gears and said planet wheel being carried by and revolvable with the hollow shaft, a driven shaft and a second mangle-wheel fixed to the driven shaft and meshing with said planet wheel.

5. In a stageless change speed mechanism, the combination of a plurality of rotatably mounted shafts including coaxial drive, intermediate and driven shafts and a hollow shaft surrounding said intermediate shaft, a planetary gear including gear elements fixed respectively to said drive shaft and to said hollow shaft to travel therewith, intermediate gear elements meshing with and interconnecting the gear elements of said drive and hollow shafts, said intermediate gear elements being mounted to travel around the intermediate shaft at a rate of speed corresponding to or varying from the rotative speed of the drive shaft, a change speed mechanism connected between the drive shaft and said intermediate gear elements, a driven shaft, and a second planetary gear including gear elements carried by the intermediate and by the driven shafts and further gear elements carried by the hollow shaft and interconnecting the gear elements of the intermediate and driven shafts.

In testimony whereof I have affixed my signature.

ERNST STÖCKEMANN.